(12) United States Patent
Farhat et al.

(10) Patent No.: US 7,695,819 B2
(45) Date of Patent: Apr. 13, 2010

(54) TWO PIECE CURABLE HCR SILICONE ELASTOMERS

(75) Inventors: Samer Farhat, Pasadena, CA (US); Alan Miskell, Diamond Bar, CA (US)

(73) Assignee: Wacker Chemical Corporation, Adrian, MI (US)

(*) Notice: Subject to any disclaimer, the term of this patent is extended or adjusted under 35 U.S.C. 154(b) by 896 days.

(21) Appl. No.: 11/241,388

(22) Filed: Sep. 30, 2005

(65) Prior Publication Data

US 2007/0078251 A1    Apr. 5, 2007

(51) Int. Cl.
*B32B 9/04* (2006.01)

(52) U.S. Cl. .......................... 428/447; 528/15; 528/31; 528/32; 528/33; 528/34

(58) Field of Classification Search .............. 528/15, 528/31–34; 428/447
See application file for complete search history.

(56) References Cited

U.S. PATENT DOCUMENTS

| 5,977,249 | A | 11/1999 | Kovar et al. |
| 6,187,890 | B1 | 2/2001 | Fehn et al. |
| 6,294,635 | B1 | 9/2001 | Achenbach et al. |
| 6,441,086 | B1 | 8/2002 | Wolfer et al. |
| 6,723,916 | B2 * | 4/2004 | Flaherty et al. ............. 174/376 |
| 2002/0039658 | A1 * | 4/2002 | Bunyan et al. .............. 428/450 |

FOREIGN PATENT DOCUMENTS

| GB | 1310353 | 3/1973 |
| WO | WO 03098682 A1 * | 11/2003 |
| WO | WO 2005059008 A1 * | 6/2005 |

* cited by examiner

*Primary Examiner*—Randy Gulakowski
*Assistant Examiner*—Olatunde S Ojurongbe
(74) *Attorney, Agent, or Firm*—Brooks Kushman P.C.

(57) ABSTRACT

Solid organopolysiloxane elastomers particularly useful in gasketing applications are prepared from two normally solid addition-curable elastomer components which are not blended together prior to cure, but are contacted with each other, preferably in the form of sheets or films.

13 Claims, No Drawings

TWO PIECE CURABLE HCR SILICONE ELASTOMERS

BACKGROUND OF THE INVENTION

1. Field of the Invention

The present invention pertains to two piece, two component HCR silicone addition-curable elastomers.

2. Background Art

Addition-curable silicone elastomers find widespread use as gasketing materials, casting resins, caulks, sealants, and coatings. These elastomers contain an organopolysiloxane bearing ethylenic or ethylynic ("aliphatic") unsaturation and a further organopolysiloxane or silane bearing silicon bonded hydrogen (Si—H) functionality. The elastomers cure by hydrosilylation of the organopolysiloxane containing unsaturated groups with Si—H groups, a reaction catalyzed by a hydrosilylation catalyst, preferably platinum or platinum compounds or complexes.

Both one component and two component formulations are known. One component formulations contain both reactive components as well as the hydrosilylation catalyst in the same composition. To prevent premature cure, catalysts which are effective only at elevated temperatures and/or inhibitors which inhibit the hydrosilylation reaction must be present. However, even so, shelf life is often limited, and storage conditions must be carefully regulated. Compositions of this type, which may range from viscous liquids to pastes are commercially available, one example being RTV-1 caulks and sealants.

To avoid the limited storage stability or "pot life" of one component compositions, two component compositions are widely used industrially. In these compositions, e.g. RTV-2 elastomers, the catalyst is compounded either with the ethylenically unsaturated organopolysiloxane or with the Si—H functional components, but not with both at the same time. Prior to use, the two separate compositions are homogeneously mixed and used immediately.

Two component systems are practically limited to liquid components, which allow the compounds to be mixed employing equipment commonly available, such as static mixers, mechanical mixers, and the like. Unfortunately, the liquid nature of such products prevents their use in many applications in which pressure is to be applied prior to full cure being obtained. Under these conditions, the composition, even when quite viscous, may flow away from the area in which the elastomer is desired. It would be desirable to provide a solid elastomer composition which eliminates the above disadvantages, yet has extended or even unlimited storage life.

SUMMARY OF THE INVENTION

I has now been surprisingly discovered that addition-curable silicone elastomers may be provided in solid form in two or more components or pieces, at least one of these containing a hydrosilylation catalyst. When contacted with each other, migration of the catalyst and other components across the interface between the two pieces provides for a complete and uniform cure in the absence of mixing.

DETAILED DESCRIPTION OF THE PREFERRED EMBODIMENT(S)

In the present invention, at least two normally solid elastomeric portions are employed, one containing a hydrosilylation catalyst and either 1) an organopolysiloxane containing hydrosilylatable unsaturated groups or 2) an organopolysiloxane and/or silane containing silicon bonded hydrogen, but not both 1) and 2) together with the catalyst. A second normally solid elastomer contains no hydrosilylation catalyst, but may contain either or both of curable components 1) and 2). The normally solid components are preferably supplied in the form of a sheet or film. In the most preferred embodiment, two sheets or films (hereinafter, both: "sheets") are employed. However, it is also possible to employ a multilayer construction, preferably where the sheet containing the catalyst alternates with the catalyst free sheets. Such layered constructions may be termed A-B-A, B-A-B, A-B-A-B, etc.

In addition to the curable components and the hydrosilylation catalyst, each sheet may also contain further additives which are typical for silicone rubber compositions, including fillers, rheology control agents, reactive and non-reactive plasticizers, inhibitors, various kinds of reinforcement, pigments, dyes, flame retardants, thermal and UV stabilizers, etc.

The normally solid elastomers are solid at 25° C. and preferably are solid also at their use temperature, which may range up to 200° C. or higher. Preferably, the normally solid elastomers are solids in the range of 25° C. to 100° C., more preferably 25° C. to 200° C. In the sense employed here, solid refers to a material which will not exhibit significant liquid flow at room temperature in the absence of shear. A small cube of elastomer when left to rest at room temperature, for example, will preferably maintain its shape over an extended period. In this sense, thixotropic compositions may also be regarded as solids. It is preferred that the Shore A hardnesses of the elastomers be in the range of Shore A 10 to Shore A 90, and that the Mooney viscosity be from 10 to 200, more preferably 20 to 150, and most preferably 30 to 90.

The normally solid elastomer sheets generally are prepared from one or more organopolysiloxane gums and/or rubber bases of the desired functionality. For example, the unsaturated component may comprise a high molecular weight methylvinyl organopolysiloxane. Such products are not limited to those containing vinyl unsaturation, which is preferred, but may contain any other hydrosilylatable unsaturated group, pendant on the polysiloxane chain, or at terminal positions.

The respective A and B components are kept separate prior to use. Upon application, the two components, each of which is preferably in the form of an elastomeric sheet material, are pressed together, but not mixed, so that a surface of the A component piece contacts a surface of a B component piece. This contact may be made just prior to application or during application. For example, when employed as a flat gasket between mating surfaces, one component may be applied to one mating surface and the second component to the other mating surface. The mating parts may then be contacted and secured, e.g. by clamps, bolts, etc. Applications include, but are not limited, to those such as head gaskets in combustion engines and compressors, water pump gaskets, etc. The two components may also be contacted shortly prior to application, for example but not by limitation by hand pressure, rollers, presses, or the like, and inserted between mating surfaces before full cure has occurred, and preferably within 15 minutes of contact.

The A and B components individually may be any hydrosilylation addition curing composition component which may be provided in substantially solid form, but generally with an increased level of hydrosilylation catalysts in the catalyst-containing component, and preferably with an effective content of low viscosity and/or low molecular weight components which promote migration of the catalyst and crosslinkers across the interface between the contacting surfaces of the separate components.

The constituents (A) of the silicone rubber compositions according to the invention are polyorganosiloxanes which contain at least two alkenyl groups per molecule and have a viscosity such that a solid composition can be prepared, if necessary with the addition of fillers, viscosity modifiers, thixotropes, etc.

The polyorganosiloxane (A) is preferably built up from units of the formula $$R^4_a R^5_b SiO_{(4-a-b)2} \quad (I)$$

in which
a is 0, 1 or 2 and
b is 0, 1, 2 or 3, with the proviso that at least two alkenyl groups $R^4$ are present in each molecule and the sum (a+b) is <4.

Alkenyl groups which can be chosen are all the alkenyl groups which are accessible to a hydrosilylation reaction with an SiH-functional crosslinking agent. Alkenyl groups having 2 to 18, more preferably 2 to 6 carbon atoms, such as vinyl, allyl, methallyl, 1-propenyl, 5-hexenyl, ethynyl, butadienyl, hexadienyl, cyclopentenyl, cyclopentadienyl and cyclohexenyl, preferably vinyl and allyl, are preferably used.

$R^5$ is a substituted or unsubstituted, aliphatically saturated, monovalent hydrocarbon radical having 1 to 18 carbon atoms, more preferably 1 to 10 carbon atoms, and most preferably 1 to 6 carbon atoms. Examples of these are alkyl groups such as methyl, ethyl, propyl, butyl and hexyl, cycloalkyl groups such as cyclopentyl, cyclohexyl and cycloheptyl, aryl and alkaryl groups such as phenyl, tolyl, xylyl, mesityl, benzyl, beta-phenylethyl and naphthyl, or halogen-substituted groups, such as 3,3,3-trifluoropropyl, o-, p- and m-chlorophenyl, bromotolyl and beta-cyanoethyl. Methyl and phenyl groups are most preferred.

The alkenyl groups can be bonded in any position of the polymer chain, in particular to the terminal silicon atoms. Constituent (A) can also be a mixture of various polyorganosiloxanes containing alkenyl groups which differ, for example, in the alkenyl group content, the nature of the alkenyl group or structurally.

The structure of the polyorganosiloxanes containing alkenyl groups can be linear, cyclic or branched. In addition to monofunctional units, such as $R^4 R^5_2 SiO_{1/2}$ and $R^5_3 SiO_{1/2}$, and difunctional units, such as $R^5_2 SiO_{2/2}$ and $R^4 R^5 SiO_{2/2}$, branched polyorganosiloxanes also contain trifunctional units, such as $R^5 SiO_5 SiO_{3/2}$ and $R^4 SiO_{3/2}$, and/or tetrafunctional units of the formula $SiO_{4,2}$, in which $R^4$ and $R^5$ have the meaning given above for these radicals. The content of these tri- and/or tetrafunctional units leading to branched polyorganosiloxanes, which is typically very low, i.e., less than 0.1 mole %, should not substantially exceed 20 mole %. The polyorganosiloxane containing alkenyl groups can also contain units of the formula —OSi($R^6 R^7$)$R^8$Si($R^6 R^7$)O— in which both $R^6$ and $R^7$ have the meaning given above for $R^4$ and $R^5$, and $R^8$ is a bivalent organic radical, such as ethylene, propylene, phenylene, diphenylene or polyoxymethylene.

Preferred rubbers and gums which correspond to these components have the general formula $$R_a R^1_{3-a} Si-[OSiRR^1]_n-[OSiR_2]_m-[OSiR^1_2]_o- \\ OSiR_a R^1_{3-a} \quad (II)$$

where R is an alkyl, aryl, or aralkyl group, in particular a $C_{1-18}$ alkyl or $C_{6-10}$ aryl group, each optionally substituted by CN, F, Cl, where a is an integer from 1-3; where $R^1$ is an ethylenically or ethylenically unsaturated group, preferably a $C_{2-18}$ alkenyl or alkynyl group, an aryl group bearing an unsaturated group such as a styryl group or a vinyltoluyl group, preferably a vinyl, allyl, methallyl, isopropenyl, ω-propenyl, ω-hexenyl, acryloyloxy, or methlacryloyloxy group, most preferably a vinyl group, and n, m, and o are integers which together produce a molecule with a molecular weight in the range of 100,000 to 30,000,000, preferably 200,000 to 3,000,000. The number of n and o groups are preferably such that the total weight percentage of unsaturated groups, calculated as vinyl groups, is from 0.0001 weight % to 20 weight %, more preferably 0.01 to 18 weight percent, and most preferably 0.1 weight percent to 15 weight percent. Preferred also are gums containing from 0.1 to about 4 weight percent unsaturated groups, calculated as vinyl groups.

Although not shown by the above formula, the silicone rubbers or gums may also contain branched siloxy groups of the formulae $SiO_{4/2}$, $RSiO_{3/2}$, $R^1 SiO_{3/2}$, and $R^2 SiO_{3/2}$ units, where $R^2$ is a polysiloxane chain which may contain the same units as in formula I. The gum plasticity of the gum components is preferably in the range of 0 to 150 mm, more preferably 60-120 mm, and most preferably 85-115 mm.

The use of the polydimethylsiloxanes containing vinyl groups, the molecules of which correspond to the formula $$(ViMe_2 SiO_{1/2})_2 (ViMeSiO_{1/2})_a (Me_2 SiO)_b \quad (III)$$

where a and b such that the vinyl-functional polymers have the vinyl content and viscosity or plasticity previously described, and the vinylmethylsiloxy and dimethylsiloxy groups can be present in any order in the molecule.

The organopolysiloxane rubbers and gums are preferably organopolysiloxanes which contain vinyl, methyl, and phenyl substituents, most preferably vinyl and methyl substituents. Preferred silicone rubbers are vinylmethylsilicone base rubbers having a Shore A hardness of from 10 to 90, in particular 40 to 60, the latter available from Wacker Chemicals, Adrian, Michigan as ELASTOSIL® 401 HCR silicones, i.e. ELASTOSIL® 401/40S and ELASTOSIL® 401/60S HCR silicones. Other ELASTOSIL® elastomer components are available from the same source and are also suitable, as are other rubbers and gums available commercially from other sources.

The unsaturated organopolysiloxane base composition preferably contains a high vinyl content organopolysiloxane gum, the distinction between gum and rubber base being that the latter generally contains fillers and other additives and is thus usually harder than a gum. The high vinyl organopolysiloxane gum preferably contains from 0.0001 weight percent to 20 weight percent vinyl groups, more preferably 0.01 to 15 weight percent vinyl groups, and yet more preferably 0.1 to 13 weight percent. The majority of gums contain from about 0.01 to 0.50 weight percent vinyl groups. Among the preferred high vinyl content organopolysiloxane gums are a 3.1% vinyl polydimethylvinylmethylsiloxane, and a 12.87% vinyl polydimethylvinylmethylsiloxane.

For increased fluid resistance, the sheets may include silicones which impart such properties, in particular fluorosilicones which bear partially or perfluorinated alkyl groups such as trifluoromethyl, hexafluoropropyl, and heptafluoropropyl groups. An example of such a fluorosilicone organopolysiloxane is fluorosilicone base rubber LS-2840, available from Dow Corning Corporation. Fluorosilicones are seldom used alone, but are generally compounded with non-fluorinated components as described previously.

Hydroxy-terminated gums, rubbers, and fluids, and vinyl-terminated gums, rubbers, and fluids may also be employed in the compositions. Such products are commercially available from numerous sources. The rubber bases and gums previously described may be employed as but a single component or as a mixture of components. To lower viscosity or plasticity and/or to increase crosslinking density, the rubbers, gums, or mixtures thereof may be blended with lower molecular weight unsaturated oligo- or polysiloxanes, and may be blended with non-functional organopolysiloxanes such as polydimethylsiloxanes and organopolysiloxanes containing methyl and phenyl substituents. Preferably, such non-functional organopolysiloxanes are high molecular weight, high viscosity or elastomeric materials. However, silicone fluids such as liquid polydimethylsiloxanes may be employed as well. Silicone fluids with methyl, phenyl, and both methyl and phenyl groups may be particularly useful when exuding of such components over time, for example to form a lubricant film, is desired. Such liquid siloxanes are also advantages in promoting catalyst mobility across the two piece gasket components.

The Si—H component may be a silane or an organopolysiloxane having pendant and/or terminal Si—H groups. The Si—H functional component should, on average, contain more than 2 mol of Si—H functionality per molecule, more preferably more than 2.5 Si—H functionalities per molecule, and most preferably 3 or more.

Constituent (B) of the silicone rubber composition according to the invention contains an SiH— functional polyorganosiloxane which is built up from units of the formula $$H_c R^5_d SiO_{(4-c-d)/2}$$

in which c is 0, 1, or 2 and d is 0, 1, 2 or 3, with the proviso that the sum (c+d) is <4 and at least two silicon-bonded hydrogen atoms are present per molecule. The use of a polyorganosiloxane containing three or more SiH bonds per molecule is preferred. If a constituent (B) containing only two SiH bonds per molecule is used, the polyorganosiloxane (A) containing alkenyl groups preferably contains at least three alkenyl groups per molecule.

The polyorganosiloxane (B) is employed as a crosslinking agent. The hydrogen content of the crosslinking agent, which is based exclusively on the hydrogen atoms bonded directly to silicon atoms, is preferably in the range from 0.002% to 2.5% by weight of hydrogen, more preferably between 0.1% and 1.7% by weight of hydrogen.

The polyorganosiloxane (B) preferably contains at least three and preferably not more than 600 silicon atoms per molecule. The use of SiH crosslinking agents which contain between 4 and 200 silicon atoms per molecule is more preferred.

The structure of the polyorganosiloxane (B) can be linear, branched, cyclic or network-like. Linear and cyclic polyorganosiloxanes (B) are composed of units of the formula $HR^5_2SiO_{1/2}$, $R^5_3SiO_{1/2}$, $HR^5SiO_{2/2}$ and $R^5_2SiO_{2/2}$, in which $R^5$ has the meaning given above. Branched and network-like polyorganosiloxane (III) additionally contain trifunctional units, such as $HSiO_{3/2}$, and $R^5SiO_{3/2}$, and/or tetrafunctional units of the formula $SiO_{4/2}$. As the content of tri- and/or tetrafunctional units increases, these crosslinking agents have a network-like, resinous structure. The organic radicals $R^5$ contained in the polyorganosiloxane (B) are usually chosen such that these are compatible with the organic radicals present in constituent (A), and preferably, the organic radicals in the (B) component are predominantly of the same type as those in the (A) component.

Preferred organopolysiloxane bearing Si—H groups are those of the formula $$R_a H_{3-a} Si—[OSiRH]_p [OSiR_2]_q —OSiR_a H_{3-a}$$

where a is an integer from 1 to 3, R is as defined previously and is preferably methyl or phenyl, more preferably methyl, and p and q are integers such that the Si—H functional organopolysiloxane is a liquid, rubber, or gum.

Preferred silanes are low molecular weight organosilicon compounds bearing silicon-bonded hydrogen, preferably two or more silicon bonded hydrogens per molecule and more preferably three or more silicon bonded hydrogens. Examples include methyltris(dimethylsiloxy)silane and phenyltris(dimethylsiloxy)silane. Use of low molecular weight silanes is particularly advantageous since these components may also migrate between adjacent sheets and assist in the full cure of the two piece rubber articles.

Plasticizers may also be employed in the compositions. Suitable plasticizers include all those used hereto, and any which are able to plasticize the composition. The plasticizers are preferably soluble in the respective two piece compositions. Suitable plasticizers include phosphate esters such as tricresylphosphate, diesters such as dioctylphthalate, and the like, and most preferably, silicone fluids, most preferably non-functional fluids such as polydimethylsiloxanes and polysiloxanes bearing methyl groups, phenyl groups or methyl and phenyl groups. Organopolysiloxane plasticizers generally have a viscosity of 10 to 10,000 mPa·s at 25° C., but may be higher or lower as well. The plasticizer, when employed, may assist in the migration of components across the interface between adjoining sheets. Suitable plasticizers also include hydroxyl-functional silicone fluids, since in addition curable silicone compositions such as those of the present invention, the hydroxyl group is essentially inert.

Reactive plasticizers may also be present. Such plasticizers include silicone fluids which have but a single reactive group such as a vinyl group or a single silicon-bonded hydrogen. The amount of plasticizer is selected based on the properties desired, and may range from no plasticizer at all to 10 weight percent or more. When phenyl silicone fluids are used, these tend to be somewhat incompatible with other components which bear predominately lower alkyl groups such as methyl groups, and their amounts are preferably in the range of 0.01 parts plasticizer per hundred parts of the respective component to 3 parts per hundred. Amounts of about 1.0 parts per hundred are particularly preferred.

The curable silicone rubber composition preferably comprises the polyorganosiloxane (B) in an amount such that the molar ratio of SiH groups to alkenyl groups in both components is between 0.1 and 10, more preferably between 0.5 and 5, and most preferably between 1.0 and 3.0.

Resinous organopolysiloxanes may also be employed in the compositions. Resinous polyorganosiloxanes generally consist of units of the formulae $R^5_3SiO_{1/2}$, $R^5SiO_{3/2}$ and/or $SiO_{4/2}$, and if appropriate $R^5_2SiO_{2/2}$. The molar ratio between the mono-functional and tri- or tetrafunctional units of these resinous polyorganosiloxanes is preferably in the range from 0.5:1 to 1.5:1. The compounds can also contain functional groups, in particular alkenyl groups, in the form of $R^4R^5_2SiO_{1/2}$ and/or $R^4R^5SiO_{2/2}$ units.

A hydrosilylation catalyst is necessary for the addition reaction (hydrosilylation) between the alkenyl groups of constituent (A) and the silicon-bonded hydrogen atoms of constituent (B). Numerous suitable hydrosilylation catalysts have been described in the literature. In principle, all the hydrosilylation catalysts usually employed in addition-crosslinking silicone rubber compositions can be used.

However, platinum compounds or complexes are preferably used. Those platinum compounds which are soluble in polyorganosiloxanes are more preferred. Soluble platinum compounds which can be used are, for example, the platinum-olefin complexes of the formulae $(PtCl_2 \cdot olefin)_2$ and $H(PtCl_3 \cdot olefin)$, where alkenes having 2 to 8 carbon atoms, such as ethylene, propylene and isomers of butene and octene, or cycloalkenes having 5 to 7 carbon atoms, such as cyclopentene, cyclohexene and cycloheptene, are preferably employed. Other soluble platinum catalysts are the platinum-cyclopropane complex of the formula $(PtCl_2C_3H_6)_2$, the reaction products of hexachloroplatinic acid with alcohols, ethers and aldehydes and mixtures thereof, or the reaction product of hexachloroplatinic acid with methylvinylcyclotetrasiloxane in the presence of sodium bicarbonate in ethanolic solution. Complexes of platinum with vinylsiloxanes, such as sym-divinyltetramethyldisiloxane, are more preferred.

The amount of hydrosilylation catalyst employed depends on the desired rate of crosslinking and economic aspects. If the usual platinum catalysts are used, the platinum metal content of the curable silicone rubber composition is preferably in the range from 2000 to 50,000 ppm by weight, more preferably 5000 ppm to 30,000 ppm, and most preferably 10,000 to 20,000 ppm calculated as weight of platinum metal. These amounts are higher than generally employed in, for example, RTV-1 or RTV-2 compositions. The amount of catalyst which is necessary to effect complete cure is partially dependent upon the thickness of the pieces, preferably sheet materials, which are contacted together. Thinner sheets will allow for easier migration and penetration into adjoining sheets, for example.

Fillers may also be employed, and the use thereof is preferred. Examples of fillers are reinforcing fillers having a specific surface area measured by the BET method of at least 50 $m^2/g$, preferably 100-400 $m^2/g$, such as fumed silica, silica hydrogels dehydrated while retaining their structure, for example "aerogels", and other types of precipitated silicon dioxide; and non-reinforcing fillers having a specific surface area measured by the BET method of less than 50 $m^2/g$, such as quartz flour, diatomaceous earth, calcium silicate, zirconium silicate, zeolites, clays, metal oxides, such as iron oxide, zinc oxide, titanium dioxide and aluminum oxide, metal carbonates, such as calcium carbonate and magnesium carbonate, zinc carbonate, metal sulfates, such as calcium sulfate and barium sulfate, lithopones, mica, chalk and fibers. The fillers mentioned can be hydrophobized by treatment with hydrophobizing agents.

To achieve a sufficiently high mechanical strength of the silicone rubber, it is preferable to incorporate actively reinforcing fillers into the silicone rubber compositions. The use of hydrophobic fillers is particularly advantageous, since these can be mixed directly into the components in a simple manner, while the mixing-in of hydrophilic fillers generally necessitates addition of a hydrophobizing agent. Processes for the preparation of hydrophobic fillers and their use in silicone rubbers are known. The preferred content of actively reinforcing filler in the curable silicone rubber composition is in the range from 0% to 60% by weight, preferably 0.1% to 20% by weight, and most preferably about 0.5% to 15% by weight, relative to the weight of the respective component.

Inhibitors may also be employed. Inhibitors are additives which are used for controlled adjustment of the processing time and rate of crosslinking of the curable silicone rubber composition. These inhibitors and stabilizers may be, for example, acetylenic alcohols such as ethynylcyclohexanol and 2-methyl-3-butyn-2-ol, polymethylvinylcyclosiloxanes such as methylvinylcyclotetrasiloxane, low molecular weight siloxane oils having vinyldimethylsiloxy end groups, trialkyl cyanurates, alkyl maleates, such as diallyl maleate and dimethyl maleate, alkyl fumarates, such as diethyl fumarate and diallyl fumarate, organic hydroperoxides, such as cumene hydroperoxide, tert-butyl hydroperoxide and pinane hydroperoxide, organic peroxides, benzotriazole, organic sulfoxides, organic amines and amides, phosphines, phosphites, nitriles, diaziridines and oximes.

Thermal stabilizers may also be employed, for example heat stabilizers such as carbon black, graphite, metal dusts and compounds of Ti, Mn, Fe, Co, Ni, Cu, Zr, Hf and Ce. Since the various heat stabilizers sometimes have different action mechanisms, a higher heat-stabilizing effect, for example in respect of individual mechanical properties, can often be achieved by combination thereof than if a single heat stabilizer is used.

Processing additives may also be employed. Such additives may aid in the preparation of the individual components or subassemblies thereof, or may aid in the handling properties of the finished A and B components. An example of a preferred processing additive is a composition prepared by admixing a high viscosity, e.g. an $8 \times 10^6$ mPa·s polydimethylsiloxane, with boric acid, silica, and a fatty acid salt, as disclosed in U.S. Pat. No. 6,441,086. Such an additive is generally employed in amounts of 0.1 weight percent to 5 weight percent based on the total weight of the respective component, more preferably 0.5 to 2.5 weight percent, and most preferably 1.0 to 2.0 weight percent.

As indicated previously, limited portions of completely non-functional rubber base or gums, for example, high molecular weight PDMS may be employed in addition to their corresponding unsaturated components, particularly for adjusting such properties as softening behavior, processing, flexibility, and surface tack. The amounts employed must not be so high as to prohibit cure, however. The amounts allowable are readily determined by preparation of sheet materials and assessing the curing behavior. Preferably, such non-functional rubbers and gums are used in minimal amounts or are avoided.

The mixing of the individual components present in each of the pieces of the subject invention rubber compositions is accomplished by conventional steps, for example in a kneader, extruder, or on a mill. Reference may be had to U.S. Pat. Nos. 6,441,086 and 6,294,635 which are incorporated herein by reference. Reference may also be had to Noll, CHEMISTRY AND TECHNOLOGY OF SILICONES© 1968, Academic Press, N.Y. The compounded components are then preferably calendared into sheets, each sheet containing one of the two components.

The sheets may also contain fibrous reinforcement, either in the form of woven or non-woven fabric, in the form of strands, or in the form of partially opened or fully opened strands, i.e. individual filaments. Discontinuous short fibers, in the form of strands and/or filaments are preferred. Suitable fibers include both organic and inorganic fibers typically used for reinforcement of elastomers, thermoplastics, and thermoset resins. Non-limiting examples include polyester fibers, high modulus polyethylene fibers such as those sold under the trademark SPECTRA® fibers, polyamide fibers, particularly polyaramid fibers such as those sold under the trademark KEVLAR® polyaramid fibers, glass fibers, carbon fibers, ceramic fibers, metal fibers such as those of titanium, stainless steel, and the like, etc.

If the cured material is to be employed for electromagnetic shielding, metal screens, metal fibers, or conductive fillers may be employed. When metal screens or woven or nonwoven fabrics are employed, it is preferred that there by a fairly large gap between adjoining tows, strands, filaments, etc., so that migration of components past this type of reinforcement is not overly impeded. Alternatively, a tightly woven or equivalent non-woven material may be employed in a sheet, with facing sheets of the opposite type, i.e. an A-B-A or B-A-B construction, so that the migrating ingredients may migrate toward the tight reinforcement from both directions. Reinforcement may be in the form of a fiber or metal woven or nonwoven material. In the same manner, even continuous sheets or films may be employed in such sandwich constructions, e.g. thermoplastic films which may serve as barriers to the flow of gases or liquids, or metal foils which may be employed for electromagnetic shielding. It is further possible to impregnate such woven or non-woven materials with an A or B component, for example by knife coating, dispersion (solution) coating, calendaring, etc., these materials then being an intimate part of the A or B component.

In use, the two or more pieces of normally solid elastomer, preferably in the form of sheets, are placed in contact. At this time, curing begins, and very surprisingly, notable increase in stiffness occurs rapidly, generally within 15 minutes, with complete cure being effected over a somewhat longer period, for example but not by limitation, from 1 to 6 hours, more preferably from 2 to 4 hours. Contact may be by simple contact, or through the use of rollers, nips, double band presses, or in the case of gaskets, for example, by pressure resulting when the components between which the gasket resides are forced together. When pressurized contact is made, screens or loosely woven fabrics, etc., may be placed between the respective sheets, as long as the sheets can come into contact with each other through holes, interstices, etc., in the screen or fabric. Press molding can also be employed, as may other molding methods. However, it is noted that the components are merely abutted together, and not mixed or blended. Thus molding processes such as injection molding employing single or double screw extruders is not possible.

Because neither of the respective sheet materials contains all ingredients necessary for cure, their individual shelf lives are very long. Moreover, because each sheet material is itself a normally solid component, the materials, when used as a gasket, for example, will not overly exude from the gasketing volume under the pressures which are ordinarily used, in contrast to conventional materials such as RTV elastomers and LSR elastomers.

In the sense of the present invention, by the term "integral organopolysiloxane elastomer" is meant that after contact of a surface of an A component with a B component in the desired application, both components, preferably in the form of sheet materials or articles cut therefrom, and after a period sufficient to provide curing of the components after being contacted, can no longer be separated without destruction of one or more of the components. By the term "not mechanically blended together" is meant that the components A and B are contacted, optionally under pressure, but without mixing in devices such as roll mill, Banbury mixers, extruders, and the like. Any mixing of the two components will be limited to that which occurs by interfacial contact of the two components under the conditions employed. By "migratable hydrosilylation catalyst" is meant a hydrosilylation catalyst which can migrate across the interface between two contacted A and B components. Thus, for example, supported catalysts such as platinum or platinum complexes irreversibly bound to supports such as carbon, silica, etc., and which cannot migrate, are unsuitable as the sole catalyst. However, such non-migratable hydrosilylation catalysts may be used in addition to migratable catalysts. It is noted that the practical upper limit of catalyst concentration is limited only by economic considerations.

EXAMPLES 1-10

"A" and "B" sheet materials are prepared from customary HCR addition curable silicone rubber ingredients. In each case, the components are mixed in a laboratory mill, initially at room temperature, until homogenous. Sheets are then prepared by calendaring. In each case, the "A" sheet materials contain rubber base material which is vinylmethyl functional, silicone gum which also is vinylmethyl functional, and platinum hydrosilylation catalyst. Also in each case, the "B" sheet materials contain base rubber and gum as with the "A" materials, along with a polyfunctional Si—H silane crosslinker and/or organopolysiloxane Si—H functional crosslinker, but no hydrosilylation catalyst. After preparation of the sheets, which are typical rubbery solids, the sheets are contacted together by hand and the curing behavior observed. Following initial stiffening, complete and thorough cure is obtained in each case. The detailed formulations and their cure times are represented in Tables 1 and 2. The sheets could not be separated following cure, which appeared to be uniform throughout the thickness of the sheet.

In the examples which follow, a more complete description of the individual components is as follows:

Vinylmethylsilicone base rubber 1: ELASTOSIL® R 401/60 base rubber, available from Wacker Chemicals.

Vinylmethylsilicone base rubber 2: ELASTOSIL® R 401/40 base rubber, available from Wacker Chemicals.

Vinylmethylsilicone gum (12.87% vinyl): A vinylmethylsiloxy dimethylsiloxy copolymer, ViMe$_2$Si terminated, having a plasticity of 80±12 and 12.87 weight percent vinyl groups.

Vinylmethylsilicone gum (3.10% vinyl): A vinylmethylsiloxy dimethylsiloxy copolymer, ViMe$_2$Si terminated, having a plasticity of 90±15 and 3.10 weight percent vinyl groups.

Fluorosilicone base rubber: Dow Corning SILASTIC® LS-2840 fluorosilicone rubber.

Hydroxy-terminated silicone fluid 1: A dimethylsilanol-terminated polydimethylsiloxane fluid available from Wacker Chemicals as fluid X345.

Hydroxy-terminated silicone fluid 2: A dimethylsilanol-terminated polydimethylsiloxane fluid available from Wacker Chemicals as fluid X325.

Platinum Catalyst: Catalyst OL available from Wacker Chemicals, a divinyltetramethyldisoloxane platinum complex in polydimethylsiloxane fluid.

Polyfunctional Silane: phenyltris(dimethylsiloxy)silane, available from Clariant LSC.

Silane crosslinker 1: Si—H functional crosslinker V-58 from Wacker Chemicals.

Silane crosslinker 2: Polymethylhydrosiloxane X-28792 from GT Products, Texas.

50% TiO$_2$ masterbatch: 50 weight percent TiO$_2$ in ELASTOSIL® R 401/40 base rubber, available from Wacker-PSI as T102MB.

50% fumed TiO$_2$ masterbatch: 50 weight percent fumed TiO$_2$ in vinylmethylsilicone gum containing 0.12 weight percent vinyl (Vi) groups having a plasticity of 99±15, and 70/30 Vi/Me termination, available from Wacker Chemicals as P-25 MB.

50% cerium hydroxide masterbatch: 50 weight percent cerium hydroxide in PDMS fluid from Dow Corning as SILASTIC® HT-1 modifier.

Grey pigment/silicone masterbatch: PSI-7814GRY from Wacker-PSI, Chino, Calif.
Blue pigment/silicone masterbatch: CBLU2 MB from Wacker-PSI.
Magnesium oxide powder: MAGLITE Y® magnesium oxide from C.P. Hall Corp.
Fumed silica: Wacker HDK T30P
50% aramid fibers in silicone: 50 weight percent aramid fibers in polydimethyl-vinylmethylsiloxane, Rhein Chemie RD-1208.
Borate additive: Prepared in accordance with U.S. Pat. No. 6,441,086.

TABLE 1

| Generic Chemical Description | Example 1 "A" Sheet | Example 1 "B" Sheet | Example 2 "A" Sheet | Example 2 "B" Sheet | Example 3 "A" Sheet | Example 3 "B" Sheet | Example 4 "A" Sheet | Example 4 "B" Sheet | Example 5 "A" Sheet | Example 5 "B" Sheet |
|---|---|---|---|---|---|---|---|---|---|---|
| Vinylmethylsilicone base rubber 1 | 70.000 | 70.000 | 70.000 | 70.000 | 70.000 | 70.000 | 70.000 | 70.000 | 60.000 | 60.000 |
| Vinylmethylsilicone base rubber 2 | — | — | — | — | — | — | — | — | — | — |
| Vinylmethylsilicone gum (12.87% vinyl) | — | — | — | — | — | — | — | — | — | — |
| Vinylmethylsilicone gum (3.10% vinyl) | 30.000 | 30.000 | 30.000 | 30.000 | 30.000 | 30.000 | 30.000 | 30.000 | 25.000 | 25.000 |
| Fluorosilicone base rubber | — | — | — | — | — | — | — | — | 15.000 | 15.000 |
| Hydroxy-terminated silicone fluid 1 | 1.000 | 1.000 | 1.200 | 1.000 | 1.000 | 1.000 | 1.000 | 1.000 | 1.000 | 1.000 |
| Hydroxy-terminated silicone fluid 2 | — | — | — | — | — | — | — | — | — | — |
| Platinum catalyst | 1.200 | — | — | — | 1.200 | — | 1.200 | — | 1.200 | — |
| Polyfunctional silane | — | — | — | — | — | 4.580 | — | 4.580 | — | 4.500 |
| Silane crosslinker | — | 12.000 | — | 12.000 | — | 12.000 | — | 12.000 | — | 12.000 |
| Silane crosslinker | — | — | — | — | — | — | — | — | — | — |
| 50% titanium dioxide/silicone masterbatch | — | — | — | — | — | — | 1.000 | 1.000 | 1.000 | 1.000 |
| 50% fumed titanium dioxide/silicone masterbatch | — | — | — | — | — | — | — | — | — | — |
| 50% Cerium hydroxide/silicone masterbatch | — | — | — | — | — | — | — | — | — | — |
| Grey pigment/silicone masterbatch | — | — | — | — | — | — | — | — | — | — |
| Blue pigment/silicone masterbatch | — | — | — | — | — | — | — | — | — | — |
| Magnesium oxide powder | — | — | — | — | — | — | 1.200 | 1.200 | 1.200 | 1.200 |
| Fumed Silica | — | — | 1.500 | 1.500 | 1.500 | 1.500 | 1.500 | 1.500 | 1.500 | 1.500 |
| 50% aramid fibers in silicone | — | — | — | — | — | — | — | — | — | — |
| Borate additive | — | — | 1.500 | 1.500 | 1.500 | 1.500 | 1.500 | 1.500 | 1.500 | 1.500 |
| TOTAL PHR | 102.200 | 113.000 | 105.200 | 116.000 | 105.200 | 120.580 | 107.400 | 122.780 | 107.400 | 122.700 |
| Set up time, minutes | 35 minutes | | 35 minutes | | 15 minutes | | 15 minutes | | 15 minutes | |
| Time to cure, hours | 4-6 hours | | 4-6 hours | | 2-4 hours | | 2-4 hours | | 2-4 hours | |

TABLE 2

| Generic Chemical Description | Example 6 "A" Sheet | Example 6 "B" Sheet | Example 7 "A" Sheet | Example 7 "B" Sheet | Example 8 "A" Sheet | Example 8 "B" Sheet | Example 9 "A" Sheet | Example 9 "B" Sheet | Example 10 "A" Sheet | Example 10 "B" Sheet |
|---|---|---|---|---|---|---|---|---|---|---|
| Vinylmethylsilicone base rubber 1 | 60.000 | 60.000 | 60.000 | 60.000 | 60.000 | 60.000 | — | — | — | — |
| Vinylmethylsilicone base rubber 2 | — | — | — | — | — | — | 60.000 | 60.000 | 60.000 | 60.000 |
| Vinylmethylsilicone gum (12.87% vinyl) | — | — | — | — | 25.000 | 25.000 | — | — | — | — |
| Vinylmethylsilicone gum (3.10% vinyl) | 25.000 | 25.000 | 25.000 | 25.000 | — | — | 25.00 | 25.000 | 25.000 | 25.000 |
| Fluorosilicone base rubber | 15.000 | 15.000 | 15.000 | 15.000 | 15.000 | 15.000 | 15.000 | 15.000 | 15.000 | 15.000 |
| Hydroxy-terminated silicone fluid 1 | 1.000 | 1.000 | 1.000 | 1.000 | 1.000 | 1.000 | — | — | — | — |
| Hydroxy-terminated silicone fluid 2 | — | — | — | — | — | — | 1.000 | 1.000 | 1.000 | 1.000 |
| Platinum catalyst | 1.200 | — | 1.200 | — | 1.600 | — | 1.500 | — | 1.500 | — |
| Polyfunctional silane | — | 4.500 | — | 4.500 | — | 4.500 | — | 4.500 | — | 4.500 |
| Silane crosslinker | — | 12.000 | — | 12.000 | — | 10.000 | — | 12.000 | — | 12.000 |
| Silane crosslinker | — | — | — | — | — | — | — | — | — | — |
| 50% titanium dioxide/silicone masterbatch | — | — | 1.000 | 1.000 | — | — | 5.000 | 5.000 | 5.000 | 5.000 |
| 50% fumed titanium dioxide/silicone masterbatch | — | — | — | — | 3.000 | 3.000 | — | — | — | — |
| 50% Cerium hydroxide/silicone masterbatch | — | — | — | — | 1.500 | 1.500 | — | — | — | — |
| Grey pigment/silicone masterbatch | 2.000 | 2.000 | — | — | — | — | — | — | — | — |
| Blue pigment/silicone masterbatch | 0.002 | 0.002 | — | — | — | — | — | — | — | — |
| Magnesium oxide powder | 1.200 | 1.200 | 1.200 | 1.200 | 1.200 | 1.200 | 0.750 | 0.750 | 0.750 | 0.750 |
| Fumed Silica | 1.500 | 1.500 | 1.500 | 1.500 | 1.500 | 1.500 | 2.500 | 2.500 | 2.500 | 2.500 |
| 50% aramid fibers in silicone | — | — | — | — | — | — | 4.000 | 4.000 | 10.000 | 10.000 |
| Borate additive | 1.500 | 1.500 | 1.500 | 1.500 | 1.500 | 1.500 | 1.500 | 1.500 | 1.500 | 1.500 |
| TOTAL PHR | 108.402 | 123.702 | 107.400 | 122.700 | 111.300 | 124.200 | 116.250 | 131.250 | 122.250 | 137.250 |
| Set up time, minutes | 15 minutes | | 15 minutes | | 15 minutes | | 15 minutes | | 15 minutes | |
| Time to cure, hours | 2-4 hours | | 2-4 hours | | 2-4 hours | | 2-4 hours | | 2-4 hours | |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cured, integral organopolysiloxane elastomer comprising a cured assembly of at least two contacted, elastomer-forming components solid at room temperature, which are not mechanically blended together, said two solid components comprising, between them
   1) at least one organopolysiloxane which contains aliphatic unsaturation;
   2) at least one organosilicon crosslinker containing Si—H functionality, and
   3) at least one migratable hydrosilylation catalyst, with the proviso that the (A) component contains the migratable hydrosilylation catalyst but does not contain both the Si—H functional organosilicon crosslinker and organopolysiloxanes containing aliphatic unsaturation, and the (B) component contains no hydrosilylation catalyst but may contain one or more of components 1 and 2.

2. The elastomer of claim 1, wherein said (A) component contains the migratable hydrosilylation catalyst in an amount of at least 5000 ppm calculated as metal of the hydrosilylation catalyst relative to the total weight of component (A).

3. The elastomer of claim 1 which comprises three or more layers comprising alternating (A) and (B) components each in sheet form.

4. The elastomer of claim 1, wherein at least one of components (A) and (B) further contains fibrous reinforcement.

5. The elastomer of claim 4, wherein said fibrous reinforcement is in the form of partially or fully opened chopped strands.

6. The elastomer of claim 4, wherein said fibrous reinforcement is in the form of a woven or non-woven textile material.

7. The elastomer of claim 1, wherein at least one of components (A) and (B) contains a metal mesh material.

8. The elastomer of claim 1, wherein a fiber or metal woven or nonwoven material is positioned between a component (A) and a component (B).

9. The elastomer of claim 1, wherein at least one of components (A) and (B) further comprises phenyltris(dimethylsiloxy)silane.

10. The elastomer of claim 1, wherein at least one of components (A) and (B) further comprise a reinforcing filler.

11. A combination suitable for the preparation of a cured, integral organopolysiloxane elastomer of claim 1, comprising:
   (A) a first component, solid at 25° C., comprising at least one aliphatic unsaturation-containing organopolysiloxane gum and an amount of migratable hydrosilylation catalyst effective to migrate across an interface between component (A) and a contacted component (B); and
   (B) a second component, solid at 25° C., comprising at least one organopolysiloxane or silane bearing silicon-bonded hydrogen, an aliphatic unsaturation-containing organopolysiloxane gum, but no migratable hydrosilylation catalyst wherein both component (A) and component (B) are present in sheet form.

12. The combination of claim 11, wherein said hydrosilylation catalyst is present in an amount of at least 5000 ppm relative to the weight of component (A), calculated as metal of the hydrosilylation catalyst.

13. The combination of claim 11, wherein component (A) further comprises a liquid component which increases migration of hydrosilylation catalyst into component (B).

* * * * *